May 4, 1965

E. PAGE 3,181,299

HYDRAULIC MASTER CYLINDER ASSEMBLY

Filed Sept. 9, 1963

ERNEST PAGE
Inventor

By John R. Faulkner
Clifford L. Sadler
Attorneys

May 4, 1965  E. PAGE  3,181,299
HYDRAULIC MASTER CYLINDER ASSEMBLY
Filed Sept. 9, 1963  3 Sheets-Sheet 2

ERNEST PAGE
Inventor
By John R. Faulkner
Clifford L. Sadler
Attorneys

May 4, 1965

E. PAGE 3,181,299

HYDRAULIC MASTER CYLINDER ASSEMBLY

Filed Sept. 9, 1963

ERNEST PAGE
Inventor

By John R. Faulkner
Clifford L. Sadler

Attorneys

United States Patent Office 3,181,299
Patented May 4, 1965

3,181,299
HYDRAULIC MASTER CYLINDER ASSEMBLY
Ernest Page, Upminster, England, assignor to Ford Motor Company, Dearborn, Mich., a corporation of Delaware
Filed Sept. 9, 1963, Ser. No. 307,502
Claims priority, application Great Britain, Nov. 1, 1962, 41,290/62
8 Claims. (Cl. 60—54.6)

The present invention relates to hydraulic actuating devices. More particularly, this invention concerns master cylinder assemblies of the type used in motor vehicle clutch and brake systems.

Basically, a master cylinder assembly comprises a cylindrical bore, a piston slidable within the bore, a pressure outlet from the bore and a reservoir communicating with the bore. In one type of master cylinder, sometimes referred to as a low pressure type, the port between the cylinder bore and the reservoir is closed by the piston itself. In a so-called high pressure type, the port is closed by a valve member that moves in response to movement of the piston. The present invention is concerned with the latter type.

In one such master cylinder assembly there is a cylindrical bore having a closed end with a centrally situated port that communicates with the fluid reservoir. A piston is slidably fitted in the bore so that a pressure chamber is formed between the end of the bore and the end of the piston. A pressure outlet communicates with the pressure chamber and is connected to the clutch, brake or other mechanism served by the master cylinder assembly.

A valve member is situated at the depth of the bore and is adapted to seal the port connecting the pressure chamber with the reservoir. The valve member is secured to the end of a valve stem that has its opposite end telescopically received within the piston. A coil spring is interposed between a valve member retainer at the depth of the bore and the piston in order to return the piston to its static position.

Means are provided on the valve stem so that the piston will engage the stem to withdraw the valve member away from the port in order to permit replenishing of fluid from the reservoir into the pressure chamber.

Owing to manufacturing tolerances in the lengths of the cylinder, piston, valve stem, valve member and other parts, it is difficult to insure that the piston will engage the end of the valve stem correctly when the piston travels to its return position. If the piston engages the end of the valve stem too soon on its return stroke, the piston is prevented from reaching its fully returned position and there is, consequently, a gap between the piston and the piston push rod. If the piston engages the valve stem end too late on its return stroke, the valve member is not moved into its fully opened position when the piston reaches its fully returned location.

In accordance with the present invention, it is a principal object, therefore, to provide a master cylinder of the type discussed in which manufacturing tolerances have little or no effect on the free or correct movement of the piston and valve member.

In one preferred embodiment of the present invention as applied to a master cylinder assembly of the construction previously described, an element is in frictional engagement with the outer end of the valve stem and slidable relative thereto. The element is engageable by the piston so that movement of the piston under the action of the return spring moves the valve stem and the valve member to open the port between the pressure chamber and the reservoir. During assembly of the component parts, the element is automatically moved along the valve stem to the precise position required.

The manner in which this automatic adjustment of the position of the valve element is effected in a preferred embodiment will be described later. The many objects and advantages of the present invention will become amply apparent from the following description and the accompanying drawings in which.

Figure 1:
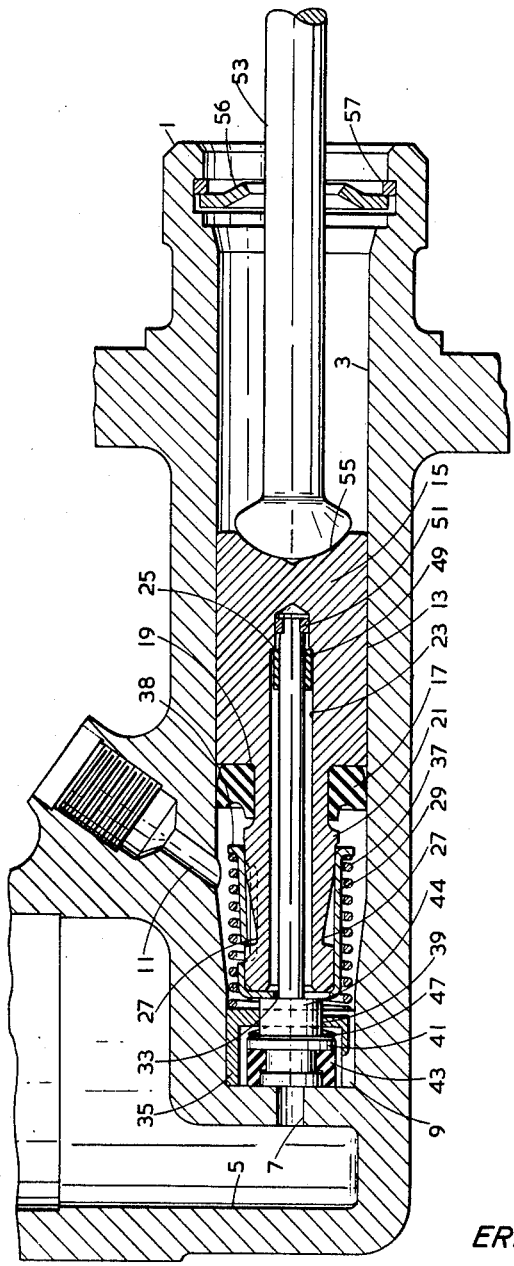
FIGURE 1 is an elevational view in section of one embodiment of a hydraulic actuator such as a motor vehicle clutch or brake master cylinder assembly constructed according to the present invention. In this view the piston is shown in a fully actuated position.

Referring now to the drawings for a more detailed understanding of the present invention, the master cylinder assembly includes a housing 1 having a cylindrical bore 3. The housing 1 also has a reservoir 5 that communicates with the interior of the bore 3 through a port 7. The port 7 provides communication between the reservoir 5 and the interior of the bore 3.

A stepped piston 13 is slidably received in the cylindrical bore 3. The volume between the end of the piston 13 and the closed end 9 of the cylinder comprises a fluid pressure chamber 10. An outlet 11 is in communication with the pressure chamber 10 and is connected to the clutch, brake or other mechanism that is to be actuated by the master cylinder assembly.

The stepped piston 13 has a wide diameter part 15 that is slidable in the bore 3 and a narrow diameter part 21 spaced inwardly thereof. A seal 17 is fitted about a portion of the piston 13 adjacent to a shoulder 19 between the wide and narrow parts 15, 21 of the piston 13. An axial bore 23 extends into the piston 13 from the narrow diameter end and has a shoulder 25 at its end. An annular recess 27 is provided on the outer surface of the narrow portion 21.

A cup-shaped return spring retainer 29 fits over the end of the narrow part 21 and has an integral spring finger 31 that engages the recess 27 so that the retainer 29 is held securely in position. The retainer 29 has an aperture 33 that overlaps the bore 23.

A stool shape retainer 35 is forced against the closed end 9 of the cylinder 3 by a return spring 37 compressed between the stool 35 and a flange 38 on the retainer 29. The stool 35 has a circular aperture 39 whose axis is in alignment with that of the bore 23.

A valve member comprising a mounting portion 41 and a rubber seal 43 is carried by a valve stem. The valve stem has a wide diameter part 44 slidable in the stool aperture 39 and a narrow diameter portion 45 that extends into the piston bore 23. A valve spring 47 of the Belleville type is interposed between the stool 35 and the mounting portion 41 and surrounds the wide diameter part 44. The spring 47 forces the valve member toward the position in which the seal 43 closes the port 7. The loading of the valve spring 47 is very much less than that of the return spring 37, for example, a few ounces as compared with several pounds.

A sleeve 49 is mounted on and frictionally engages the narrow diameter part 45 of the valve stem. The force of the frictional engagement between the sleeve 49 and valve stem portion 45 is considerably greater than the force required to compress the Belleville spring 47 but less than the force of the return spring 37. The edge of the aperture 33 in the retainer 29 overlaps the sleeve 49 and the diameter of the sleeve 49 is smaller than that of the bore 23. A collar 51 fixed to the end of the stem portion 45 prevents the sleeve from being removed.

A push rod 53 connectable in a conventional manner with a clutch or brake actuating pedal engages a recess 55 in the end of the wide diameter part 15 of the piston 13. A push rod retaining washer 56 is held in position at the outer open end of the cylinder 3 by a snap ring 57. This same snap ring 57 limits movement of the piston to the right or fully returned position.

Figure 3:
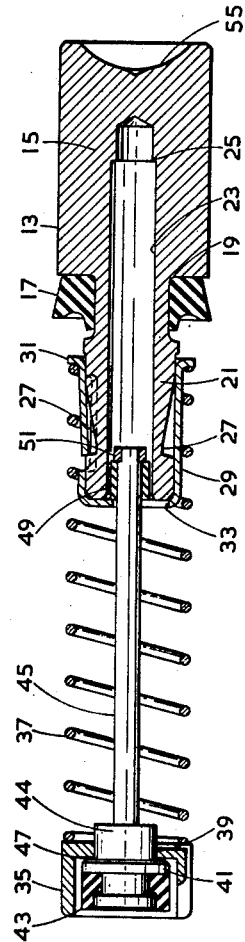
FIGURE 3 is a sectional view through a part of the assembly.

To assemble the master cylinder, the components shown in FIGURE 3 are fitted together. The return spring 37 is extended so that one end of the sleeve 49 engages the retainer 29 at the aperture 33 and the other end is engaged by the collar 51. Under these conditions, the sleeve 49 is located on the extreme end of the valve stem. The components shown in FIGURE 3 are then slid into the cylinder 3 until the stool 35 engages the closed end 9 of the cylinder 3. The push rod 53, washer 56 and snap ring 57 are then fitted.

After assembly, the piston 13 is pushed by the rod 53 to the full stroke position shown in FIGURE 1. As the piston is moved to the left, the retainer 29 ceases to engage the sleeve 49 and the valve spring 47 is, consequently, able to move the valve stem 44, 45 to the left so that the rubber seal 43 closes the port 47. The narrow diameter portion 45 of the valve stem and the sleeve 49, owing to the frictional engagement between them, move further into the bore 23. Just before the piston reaches its left-hand extreme position in which the retainer 29 engages the wide diameter portion 44 of the valve stem, the sleeve 49 contacts the shoulder 25 in the bore 23. The final movement of the piston slides the sleeve 49 to the left along the narrow diameter portion 45 of the valve stem.

Figure 2:
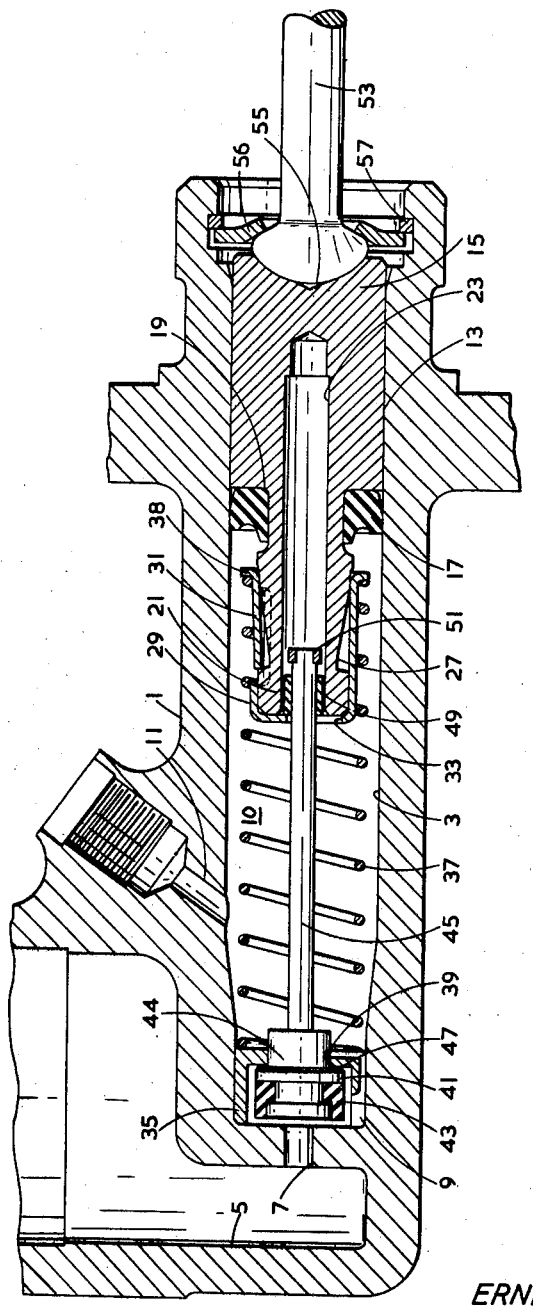
FIGURE 2 is a sectional view corresponding to FIGURE 1 with the piston shown in the fully returned position.

When the piston 13 is in its extreme left-hand position (the full stroke position of FIGURE 1), the distance between the stool 35 and the end of the sleeve 49 when the sleeve is in engagement with the shoulder 25 is less than the distance from the stool 35 to the end of the sleeve 49 when the piston is in the extreme right-hand position in engagement with the washer 56 (the fully returned position of FIGURE 2). As the push rod 53 is released and the piston moves to the right under the action of the return spring 37, the valve spring 47 holds the rubber seal 43 against the end 9 of the cylinder 3 to close the port 7 until the edge of the aperture 33 in the retainer 29 engages the sleeve 49. When this occurs, the valve stem 44, 45 is moved to the right to compress the Belleville spring 47 and open the port 7. After the spring 47 has been compressed, further movement of the valve stem 44, 45 to the right is prevented by the stool 35. Consequently the retainer 29, since the edge of its aperture 33 engages the sleeve 49, slides the sleeve 49 along the narrow portion 45 of the valve stem until the push rod 53 abuts against the washer 56.

The sleeve 49 is now precisely located on the narrow portion 45 of the valve stem so that movement of the push rod 53 through a distance equal to the distance between the rubber seal 43 and the end 9 of the cylinder results in the seal 43 closing the port 7. Thus, manufacturing tolerances in the lengths of the cylinder 3, piston 13, valve stem 44, 45, stool 53, valve member 43, and other components have no effect on the travel of the push rod 53 required to close the port 7 between the reservoir 5 and the pressure chamber 10 of cylinder 3.

The master cylinder assembly operates in a substantially conventional manner. The initial movement of the push rod 53 results in the ports 7 being closed by the seal 43 and further movement forces liquid through the outlet 11 to the brake or clutch mechanism. Release of the push rod 53 enables the return spring 37 to move the piston 13 to the right to enable liquid for the clutch or brake mechanism to enter the pressure chamber 10. During final movement of the piston 13, just before it engages the washer 56 during the return stroke, the seal 43 moves clear of the end 9 of the cylinder to open the port 7 and thus permit liquid to enter the pressure chamber 10.

Engagement of the sleeve 49 by the shoulder 25 in the piston bore only occurs during initial assembly of the components of FIGURE 3 into the cylinder 3. Normally, the sleeve 49 is axially spaced slightly from the shoulder 25.

The foregoing description presents a presently preferred embodiment of this invention. Modifications and alterations may occur to those skilled in the art to come within the scope and spirit of the following claims.

I claim:

1. A hydraulic master cylinder assembly comprising a cylinder bore having an open end and a closed end, a piston slidable in said bore and defining a pressure chamber between its end and said closed end, a pressure outlet in said bore, a fluid reservoir, a port in said closed end providing communication between said reservoir and said chamber, a valve member movable to open and close said port, said valve member having a portion with an element frictionally engageable therewith and slidable thereon, said element being engageable by said piston when said piston is moved toward said open end of said bore so that it unseats said valve member.

2. A hydraulic master cylinder assembly comprising a cylinder bore having an open end and a closed end, a piston slidable in said bore and defining a pressure chamber between its end and said closed end, a pressure outlet in said bore, a fluid reservoir, a port providing communication between said reservoir and said chamber, a valve member movable to open and close said port, said valve member having a portion with an element frictionally engageable therewith and slidable thereon, said element being engageable by said piston when said piston is moved toward said open end of said bore so that it unseats said valve member.

3. A hydraulic master cylinder assembly comprising a cylinder bore having an open end and a closed end, a piston slidable in said bore and defining a pressure chamber between its end and said closed end, a pressure outlet in said bore, a fluid reservoir, a port providing communication between said reservoir and said chamber, a valve member movable to open and close said port, first spring means urging said valve member toward a closed position, said valve member having a portion with an element frictionally engageable therewith and slidable thereon, said element being engageable by said piston when said piston is moved toward said open end of said bore so that it unseats said valve member.

4. A hydraulic master cylinder assembly comprising a cylinder bore having an open end and a closed end, a piston slidable in said bore and defining a pressure chamber between its end and said closed end, a pressure outlet in said bore, a fluid reservoir, a port in said closed end providing communication between said reservoir and said chamber, a valve member movable to open and close said port, first spring means urging said valve member toward a closed position, said valve member having a portion with an element frictionally engageable therewith and slidable thereon, said element being engageable by said piston when said piston is moved toward said open end of said bore so that it unseats said valve member.

5. A hydraulic master cylinder assembly comprising a cylinder bore having an open end and a closed end, a piston slidable in said bore and defining a pressure chamber between its end and said closed end, a pressure outlet for said chamber, a fluid reservoir, a port in said closed end providing communication between said reservoir and said chamber, a valve member movable between open and closed positions to control fluid flow through said port, retaining means adapted to limit movement of said valve member away from said port, a valve stem connected to said valve member and extending into a bore in said piston, a return spring interposed between said retainer and said piston and urging said piston toward the open end of said bore and urging said retainer against the closed end of said bore, an element in frictional engagement with said valve stem and slidable thereon, said element being engageable by said piston when said piston is moved to the open end of said bore, whereby said valve member is moved to an open position, the force required to slide said element on said valve stem being less than the force exerted by said return spring.

6. A hydraulic master cylinder assembly comprising a cylinder bore having an open end and a closed end, a piston slidable in said bore and defining a pressure chamber between its end and said closed end, a pressure outlet for said chamber, a fluid reservoir, a port in said closed end providing communication between said reservoir and said chamber, a valve member movable between open and closed positions to control fluid flow through said port, retaining means adapted to limit movement of said valve member away from said port, a valve stem connected to said valve member and extending into a bore in said piston, first spring means interposed between said retainer and said valve member urging said valve member toward a position to close said port, an element in frictional engagement with said valve stem and slidable thereon, said element being engageable by said piston when said piston is moved to the open end of said bore whereby said valve member is moved to an open position against the force of said first spring means, the force required to slide said element on said valve stem being greater than the force exerted by said first spring means.

7. A hydraulic master cylinder assembly comprising a cylinder bore having an open end and a closed end, a piston slidable in said bore and defining a pressure chamber between its end and said closed end, a pressure outlet for said chamber, a fluid reservoir, a port in said closed end providing communication between said reservoir and said chamber, a valve member movable between open and closed positions to control fluid flow through said port, retaining means adapted to limit movement of said valve member away from said port, a valve stem connected to said valve member and extending into a bore in said piston, first spring means interposed between said retainer and said valve member urging said valve member toward a position to close said port, an element in frictional engagement with said valve stem and slidable thereon, said element being engageable by said piston when said piston is moved to the open end of said bore whereby said valve member is moved to an open position.

8. A hydraulic master cylinder assembly comprising a cylinder bore having an open end and a closed end, a piston slidable in said bore and defining a pressure chamber between its end and said closed end, a pressure outlet for said chamber, a fluid reservoir, a port in said closed end providing communication between said reservoir and said chamber, a valve member movable between open and closed positions to control fluid flow through said port, retaining means adapted to limit movement of said valve member away from said port, a valve stem connected to said valve member and extending into a bore in said piston, first spring means interposed between said retainer and said valve member urging said valve member towards a position to close said port, a return spring interposed between said retainer and said piston and urging said piston toward the open end of said bore and urging said retainer against the closed end of said bore, an element in frictional engagement with said valve stem and slidable thereon, said element being engageable by said piston when said piston is moved to the open end of said bore whereby said valve member is moved to an open position against the force of said first spring means, the force required to slide said element on said valve stem being greater than the force exerted by said first spring means but less than the force exerted by said return spring.

References Cited by the Examiner
UNITED STATES PATENTS
2,332,301  10/43  Cox _____ 60—54.6 X FOREIGN PATENTS
716,008  9/54  Great Britain.
859,911  1/61  Great Britain.

JULIUS E. WEST, *Primary Examiner.*
EDGAR W. GEOGHEGAN, *Examiner.*